US012448251B2

(12) United States Patent
Boros et al.

(10) Patent No.: US 12,448,251 B2
(45) Date of Patent: Oct. 21, 2025

(54) HANDRAIL FOR AN ESCALATOR OR A MOVING WALKWAY

(71) Applicant: INVENTIO AG, Hergiswil (CH)

(72) Inventors: Csaba Boros, Dunajska Streda (SK); Georg Wagenleitner, Roßleithen (AT)

(73) Assignee: INVENTIO AG, Hergiswil (CH)

( * ) Notice: Subject to any disclaimer, the term of this patent is extended or adjusted under 35 U.S.C. 154(b) by 120 days.

(21) Appl. No.: 18/580,543

(22) PCT Filed: Jul. 4, 2022

(86) PCT No.: PCT/EP2022/068482

§ 371 (c)(1),
(2) Date: Jan. 18, 2024

(87) PCT Pub. No.: WO2023/001537

PCT Pub. Date: Jan. 26, 2023

(65) Prior Publication Data

US 2025/0122051 A1 Apr. 17, 2025

(30) Foreign Application Priority Data

Jul. 19, 2021 (EP) .................................... 21186482

(51) Int. Cl.
*B66B 23/24* (2006.01)

(52) U.S. Cl.
CPC .................................. *B66B 23/24* (2013.01)

(58) Field of Classification Search
CPC ................................ B66B 23/24; B66B 23/22
USPC .................................................. 198/335, 337
See application file for complete search history.

(56) References Cited

U.S. PATENT DOCUMENTS 2,669,339 A * 2/1954 Hansen .................. B66B 23/04 198/336
2,956,662 A 10/1960 Hansen
3,633,725 A 1/1972 Edward
3,740,799 A * 6/1973 Earle ...................... B66B 23/24 474/256
3,865,225 A * 2/1975 Phal ....................... B66B 23/24 198/337
4,852,713 A * 8/1989 Tatai ...................... B66B 23/24 198/337
7,641,038 B2 * 1/2010 El-Wardany ........... B66B 23/24 198/335

(Continued)

FOREIGN PATENT DOCUMENTS

EP 1799605 B1 7/2009
WO WO-2006087801 A1 * 8/2006 ............. B66B 23/24

OTHER PUBLICATIONS

International Search Report for International Application No. PCT/EP2022/068482 dated Sep. 29, 2022.

*Primary Examiner* — Mark A Deuble
(74) *Attorney, Agent, or Firm* — Knobbe Martens Olson & Bear LLP

(57) ABSTRACT

The disclosure relates to a handrail for a passenger transportation system in the form of an escalator or moving walkway. The handrail can include a sheet metal strip having two edge portions and a middle portion that is located between the two edge portions. The edge portions can each bent to form a bead, and the middle portion can form a handrail back extending between the beads for a hand to be placed thereon.

20 Claims, 3 Drawing Sheets

(56) References Cited

U.S. PATENT DOCUMENTS

| | | | | |
|---|---|---|---|---|
| 7,802,670 | B2 * | 9/2010 | Durrer | B66B 23/14 198/336 |
| 8,662,280 | B2 * | 3/2014 | Matheisl | B66B 23/24 198/337 |
| 8,721,949 | B2 * | 5/2014 | Wesson | B66B 23/24 198/336 |
| 10,875,745 | B2 * | 12/2020 | Boros | B66B 23/04 |

* cited by examiner

HANDRAIL FOR AN ESCALATOR OR A MOVING WALKWAY

TECHNICAL FIELD

The present disclosure relates to a handrail for a passenger transportation system designed as an escalator or a moving walkway. Furthermore, the disclosure relates to a passenger transportation system equipped with such a handrail, and to a method for producing such a handrail.

SUMMARY

A handrail or handrail belt for an escalator or a moving walkway generally comprises a plurality of fabric layers which can each be rubberized on one or both sides. A tension member in the form of steel strands, which can likewise be rubberized, can be incorporated into the fabric layers. The fabric layers can be encased by an outer protective rubber layer. Such a handrail is generally produced continuously with a length specifically adapted to the relevant escalator or the relevant moving walkway, which, on the one hand, can be very complicated and, on the other hand, can be associated with certain limitations during installation or maintenance, not least due to the relatively high weight of the handrail. In addition, the splicing of handrail belts, e.g., connecting the two ends of a handrail belt to form a continuous handrail belt is very complicated and requires expensive special tools. Furthermore, the handrails made from plastics and fabric layers are subject to environmental aging processes which are caused by bending cycles and can lead to the formation of cracks in the surface of the handrail. Germs and spores can nest and multiply in cracked handrail surfaces. In addition, the rubber-like handrails are often the target of acts of vandalism in which knifes are, for example, used to carve gouges into, or to cut entire pieces out of, the handrails. EP 1799605 A1 describes, for example, a handrail belt of the aforementioned type made of polyurethane with steel strands.

There can therefore be a need for a handrail that is vandal-proof, can be mounted more simply and/or is cheaper to produce. Furthermore, there can be a need for a corresponding passenger transportation system and for a corresponding production method.

Such a need can be met by the subject matter described herein. Advantageous embodiments are described throughout the following description.

A first aspect of the disclosure relates to a handrail for a passenger transportation system in the form of an escalator or a moving walkway. The handrail comprises a sheet-metal band which is divided transversely to its longitudinal direction into two edge portions and a central portion located between the two edge portions. The edge portions are each curved to form a bead. The central portion is shaped into a handrail back, extending between the beads, for placing a hand on.

A "sheet-metal band" can be understood to mean an elongate, band-shaped or strip-shaped piece of sheet metal, for example sheet steel. The sheet-metal band can have a thickness or material thickness of typically between 0.1 mm and 0.5 mm, for example, 0.2 mm.

An "edge portion" can be understood to mean an outer edge of the sheet-metal band extending along a longitudinal edge of the sheet-metal band.

The central portion can be an internal portion of the sheet-metal band that connects the two (opposite) edge portions to one another.

The expression "division of the sheet-metal band into the edge portions and the central portion" can be understood such that two imaginary straight lines, which delimit the central portion toward the edge portions, are drawn in parallel with the longitudinal edges of the sheet-metal band. In other words, the edge portions and the central portion can be understood as different adjacent subregions of the same piece of sheet-metal band. The sheet-metal band with its two edge portions and its central portion can in this case be designed as an integral component. This means that the handrail can be designed as an entire sheet-metal band or sheet-metal band portion by reshaping a single metal sheet.

A "bead" can be understood to mean an elongate, at least partially rounded thickened portion on the handrail back that can be tubular, at least in part, e.g., hollow on the inside. The beads could have been produced, for example, by correspondingly rolling or milling the respective edge portions. The beads can each extend on opposite sides of the handrail back and over the entire length thereof or at least over a large part of the length thereof.

A diameter of the beads can be selected, for example, on the basis of a desired height of the handrail in each case. The greater the diameter of the beads is, the higher the handrail can be in each case. In other words, the beads can serve to optimally adapt the cross-sectional shape of the handrail to a hand grasping the handrail. In addition, the stability of the handrail is increased by means of the beads.

The beads can be curved such that they face a balustrade of the escalator or of the moving walkway during operation of the handrail, e.g., are arranged on an inner side of the handrail after the handrail has been connected to form a closed ring. A surface of the handrail back, on which the hand can be placed, can in this case correspond to an outer side of the handrail.

The sheet-metal band of the handrail can, for example, be connected to form a closed ring and/or can be assembled from a plurality of sheet-metal band parts by the ends of the sheet-metal band or of the sheet-metal band parts being integrally connected to one another, for example by welding, soldering or gluing, by reshaping, for example by crimping, folding or clinching, and/or non-positively and/or positively connected to one another by using additional connecting elements, for example in the form of screws, rivets, clamping rings or clips.

For example, the ends of the sheet-metal band or of the sheet-metal band parts can be butt-welded, lap-welded, welded to one another with filler metal or without filler metal. In particular, in an overlapping region in which the ends of the sheet-metal band or of the sheet-metal band parts overlap, the sheet-metal band or the sheet-metal band parts can have the same thickness as outside the overlapping region.

The handrail back can, for example, be mostly flat. Additionally or alternatively, the handrail back can be rounded, for example curved outward.

In addition, the handrail can be lined or filled, at least in part, with a filling material, for example a special foam, for example, polyurethane foam.

Such a handrail has the advantage that it can be brought very simply to a particular length and only needs to be connected to form a ring during the assembly of the handrail or during installation of the passenger transportation system, for example by the ends of the sheet-metal band, which has been suitably cut to length, being welded to one another or integrally and/or positively connected to one another in another manner.

In addition, such a handrail has a significantly lower weight in comparison to conventional rubber-based and fabric-based handrails. Tests have shown that the weight of the handrail can be reduced to about 0.6 kg/m. This has a positive effect not only on the assembly or installation process but also, due to the correspondingly reduced amount of friction, on the energy consumption of the passenger transportation system equipped with such a handrail.

Because the handrail mostly comprises of metal, the handrail can be produced significantly less expensively since vulcanization or other complicated processing steps, which are usually required in connection with the construction of rubber-based and fabric-based handrails, can be completely omitted.

In addition, due to its metal surface, the handrail can be cleaned, e.g., kept hygienically clean, very easily. In particular, the metal material of the handrail can withstand chemicals, as can be used for cleaning or disinfecting, without, for example, embrittling, corroding or aging in any other manner over time. The metal material can also effectively withstand any plasma used for disinfecting. In contrast to plastics belts, owing to the metal material thereof, the handrail cannot embrittle and form cracks in which dirt could settle and germs could nest. Depending on the metal alloy used, the surface of the sheet-metal band or the handrail formed therefrom also has germ-reducing properties. Furthermore, such a handrail is also highly vandal-proof since a knife can barely cut its surface or can only cut it very slightly. Moreover, due to the hard surface, there is also a lack of incentive to cause any damage in the first place.

Moreover, the metal handrail is pleasant to grip since this material feels very clean and the feel is known to the users, for example from static stair rails. In addition, recycling of the handrail is simplified owing to the sheet-metal band since there is no material composite as in a conventional handrail for escalators and moving walkways.

A second aspect of the disclosure relates to a passenger transportation system in the form of an escalator or a moving walkway which comprises a handrail, as described above and below, and a drive device having at least one drive wheel for driving the handrail. In this case, the drive wheel and the handrail positively engage in one another. For example, the drive wheel can positively engage in transverse grooves and/or engagement elements of the handrail, as are described below. The drive device can comprise an electric motor which drives the drive wheel, for example a spur-cut plastics wheel. The drive device can also comprise a plurality of drive wheels which positively engage in the handrail at several points. Of course, a friction wheel, which transmits the drive force to the handrail via frictional forces, can also be used as the drive wheel.

A third aspect of the disclosure relates to a method for producing a handrail for a passenger transportation system in the form of an escalator or a moving walkway. The method comprises at least the following steps, which can be performed in the order given or in another suitable order: providing a sheet-metal band which is divided transversely to its longitudinal direction into two edge portions and a central portion located between the two edge portions; bending each edge portion to form a bead and shaping the central portion to form a handrail back, extending between the beads, for placing a hand on.

This method can be a multi-stage method in which the sheet-metal band is bent by rolling using a plurality of shaping rollers in a plurality of successive rolling stations such that it eventually has the desired handrail shape.

The sheet-metal band can subsequently be cut to a specific length as required and can, for example only at the installation site, be connected at its ends to form a closed ring, for example by the ends being butt-welded to one another.

Using such a method, production of the handrail can be considerably reduced in price and accelerated.

Features of the method, as described above and below, can also be features of the handrail, and vice versa.

Possible features and advantages of embodiments of the disclosure can be regarded, inter alia and without limiting the disclosure, as being based upon the concepts and findings described below.

On their bead underside, which faces away from the handrail back, the beads each may have a plurality of transverse grooves distributed in the longitudinal direction of the sheet-metal band. The transverse grooves can, for example, be depressions that have been formed and whose longitudinal direction can run transversely to the longitudinal direction of the sheet-metal band or of the handrail. By means of the transverse grooves, the bending stiffness of the cross section can be drastically reduced, and the elastic deformability of the sheet-metal band under bending loads, as occur in deflection regions of the handrail, can thus be improved. The handrail can thus also be used, without additional adaptations, in combination with escalators or moving walkways that specify smaller bending radii.

Transversely to their longitudinal direction, the beads each may have a curved bead portion and a straight fastening portion. The curved bead portion can comprise the transverse grooves, and the straight fastening portion can be fastened to the handrail back. The two straight fastening portions can be arranged, for example, between the two curved bead portions. The curved bead portions can, for example, each have a drop-shaped cross section. The straight fastening portions can, for example, be spot-welded to the handrail back at several points. However, other joining methods are also possible. Such beads can be produced with relatively low effort.

According to one embodiment, the transverse grooves of at least one of the beads can be designed to positively engage in at least one drive wheel of a drive device for driving the handrail. In other words, at least one of the beads, including its transverse grooves, can function as a type of bendable toothed rod or rack that can mesh with a corresponding drive wheel of the drive device. No additional components are thus required in order to mechanically couple the sheet-metal band, which is in its final shape, or the handrail to the drive wheel.

According to one embodiment, the transverse grooves can each have a v-shaped cross section. One or both flanks of the v-shaped cross section can be straight or curved or partially straight, partially curved. The two flanks can, for example, be connected to one another via a rounded channel forming a bottom of the relevant transverse groove. The v-shaped cross section can, for example, have an opening angle of 45 degrees. Depending on the application, however, any other opening angles are also possible. Transverse grooves shaped in this way have the advantage that they are complementary to various tooth flank geometries of common toothed wheels.

According to one embodiment, the transverse grooves of various beads can be arranged opposite one another in pairs. In other words, each of the transverse grooves of one bead can be precisely arranged opposite one of the transverse grooves of the other bead, e.g., the two transverse grooves can have a common longitudinal axis. In this way, the elastic deformability of the handrail can be further improved and the service life thereof can thus be extended.

According to one embodiment, the handrail can furthermore comprise a plurality of engagement elements which are fastened to the sheet-metal band and can be designed to positively engage in at least one drive wheel of a drive device for driving the handrail. In this case, the engagement elements can be distributed between the beads in the longitudinal direction of the sheet-metal band. The engagement elements can be individually fastened to the sheet-metal band, for example welded, screwed or clamped thereto, or can each be fastened to the sheet-metal band via an additional support (see below). The engagement elements can, for example, be distributed centrally between the two beads in the longitudinal direction of the sheet-metal band. The engagement elements can in this case be distributed over the entire length of the sheet-metal band. This enables the handrail to be mechanically coupled to the drive wheel independently of the transverse grooves. In addition, the engagement elements can be designed to prevent the handrail from deviating horizontally or vertically from its ideal line during operation.

According to one embodiment, the engagement elements can be fastened to the sheet-metal band via a support band. For example, the engagement elements can be welded, soldered, glued, screwed or clamped to the support band. The support band can, for example, be inserted into the sheet-metal band and extend over the entire length thereof or at least a large part of the entire length thereof. For example, it is possible for the support band to be surrounded on both sides by the two beads. In other words, the support band can be centered on the sheet-metal band by means of the two beads. The support band can be connected to the sheet-metal band at several points or continuously in order to transmit drive forces to the sheet-metal band.

According to one embodiment, the support band can be designed as an additional sheet-metal band. The production of the handrail can thus be further simplified. For example, the support band can in this case be fastened to the sheet-metal band very simply by welding or soldering.

Independently thereof, the sheet-metal band can be combined with at least one further sheet-metal band in order to reinforce the sheet-metal band.

According to one embodiment, the support band can be inserted into a gap between the straight fastening portions and the handrail back, wherein the straight fastening portions can each be fastened to the handrail back via the support band. In this way, the handrail can be designed to be particularly torsionally rigid. For example, the straight fastening portions, the support band and the handrail back can be spot-welded or seam-welded to one another at suitable points, which can be distributed over the entire length of the sheet-metal band, for example. However, other joining methods are also possible.

According to one embodiment, the handrail can furthermore comprise a heating device and/or a cooling device for heating and/or cooling the sheet-metal band. The heating device can, for example, be a fan or an induction heater for contactless heating of the sheet-metal band. In this way, the sheet-metal band can be brought to a temperature that is perceived as pleasant. For cooling, a Peltier element can, for example, be used, the cold generated thereby being, for example, blown as cooling air onto the handrail by means of a fan. Especially in areas with a more extreme climate, the handrail formed from a sheet-metal band has enormous advantages since its aging behavior, its sliding properties and its mechanical properties are hardly influenced by temperature fluctuations. In addition, due to its low mass and its good degree of thermal conductivity, the handrail can be heated or cooled very easily.

According to one embodiment, the sheet-metal band can be made from stainless steel. In this way, the corrosion resistance of the handrail can be increased. Additionally or alternatively, at least part of the sheet-metal band can be coated with a plastics layer or metal layer. The outer appearance of the handrail can thus be adapted to different requirements with low effort. Such a plastics layer or metal layer also functions as an additional protective layer for protecting the sheet-metal band against environmental influences.

According to one embodiment, the sheet-metal band can be assembled from at least two sheet-metal band parts. For example, each sheet-metal band part can be shorter than the sheet-metal band or, in other words, the total length of the sheet-metal band can be equal to the sum of the individual lengths of the sheet-metal band parts. For example, the sheet-metal band parts can have been welded or soldered to one another in order to form the sheet-metal band. In this way, the handrail can also be mounted relatively simply if it is longer than average. For example, it is possible for the sheet-metal band parts to be transported individually to the installation site and to be assembled only once they are there.

BRIEF DESCRIPTION OF THE DRAWINGS

Embodiments of the disclosure will be described below with reference to the accompanying drawings, wherein neither the drawings nor the description are intended to be interpreted as limiting the disclosure.

The drawings are merely schematic, and not to scale. In the different figures, identical reference signs denote identical or similar features.

DETAILED DESCRIPTION

Figure 1:
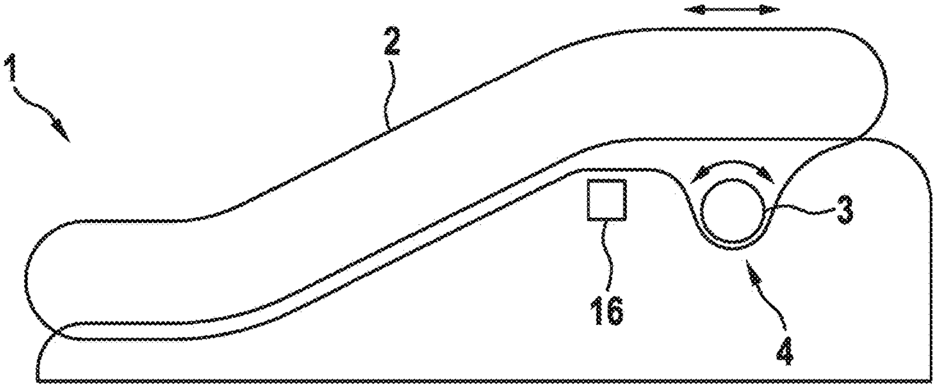
FIG. 1 shows a passenger transportation system having a handrail according to one embodiment of the disclosure.

FIG. 1 shows a passenger transportation system 1, which is designed as an escalator. The passenger transportation system 1 comprises a handrail 2 and a drive device 4 driving the handrail 2 by means of a drive wheel 3. The drive wheel 3, which can be rotatable by means of an electric motor (not shown) of the drive device 4, positively engages in a correspondingly shaped structure on the handrail 2. The construction of the handrail 2 will be described in more detail below.

Figure 2:
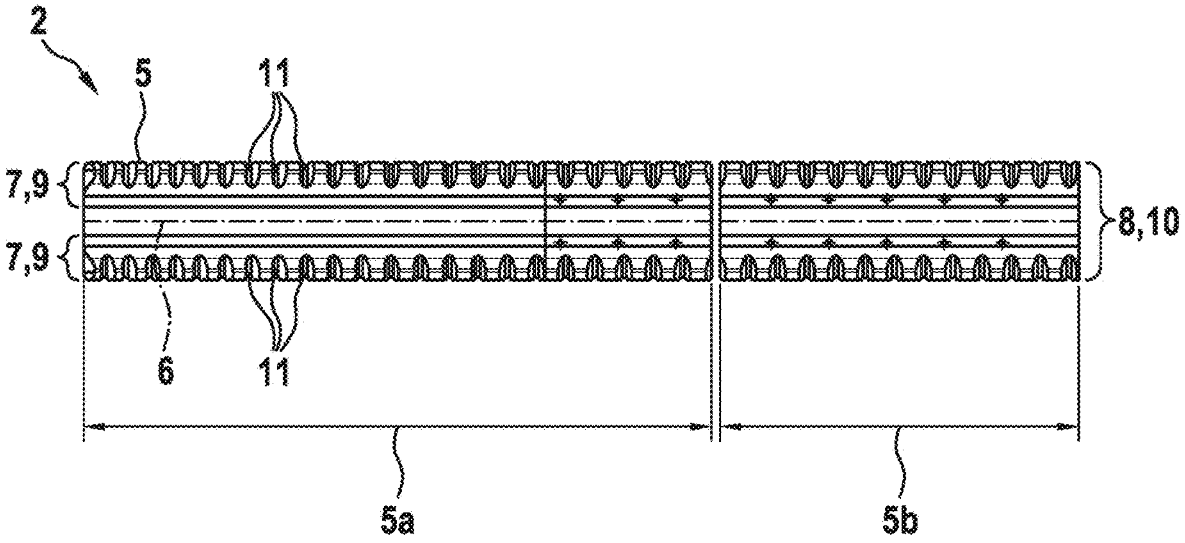
FIG. 2 is a view from below of a portion of the handrail in FIG. 1.

FIG. 2 is a plan view of an underside of the handrail 2. The handrail 2 comprises a sheet-metal band 5 which, viewed transversely to its longitudinal direction 6, comprises two outer edge portions 7 and a central portion 8 which directly connects the two edge portions 7 to one another. In other words, the two edge portions 7 and the central portion 8 extend in parallel with one another and in the longitudinal direction 6 of the handrail 2.

The sheet-metal band 5 can be designed in one piece or can be assembled from at least two sheet-metal band parts 5*a*, 5*b*, for example sheet-metal band strips.

Figure 3:
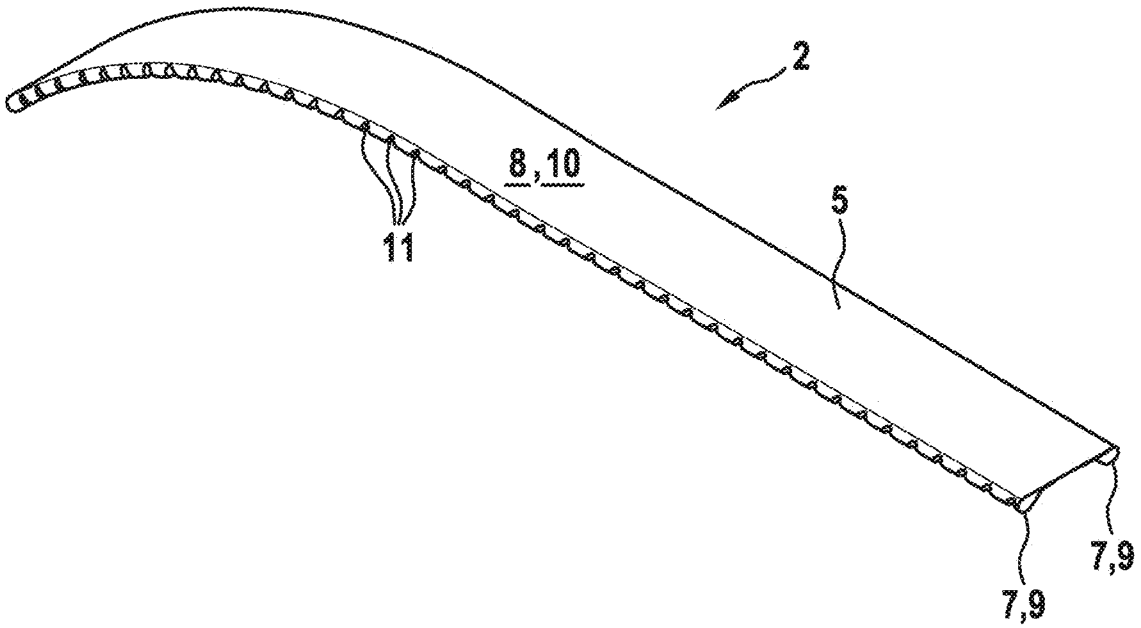
FIG. 3 is a perspective view of a portion of the handrail in FIG. 1.

Each of the two edge portions 7 is curved to form a bead 9 having a drop-shaped cross section (see also FIG. 5), wherein the central portion 8 forms a handrail back 10, which connects the two beads 9 to one another, for placing a hand on. In the embodiment shown, the handrail back 10 is designed to be straight transversely to the longitudinal direction 6 (see also FIG. 3). Of course, it could also be slightly curved.

In addition, on the bead underside 17 thereof, each of the beads 9 has a plurality of transverse grooves 11 distributed in the longitudinal direction 6, here in the form of depressions formed in the respective beads 9. The transverse grooves 11 are, by way of example, distributed over the entire length of the sheet-metal band 5 or of the handrail 2. By means of the transverse grooves 11, the flexibility of the handrail 2 in deflection regions of the passenger transportation system 1 can be significantly improved or the mechanical load of the handrail 2 on bending stresses as a result of bending cycles in the deflection regions can be significantly reduced.

It is possible for the drive wheel 3 to engage directly in the transverse grooves 11 of one or both beads 9 in order to drive the handrail 2.

In this example, the transverse grooves 11 of different beads 9 are arranged opposite one another in pairs. However, an offset arrangement of the transverse grooves 11 of one bead 9 relative to the transverse grooves 11 of the other bead 9 is also possible.

Figure 4:
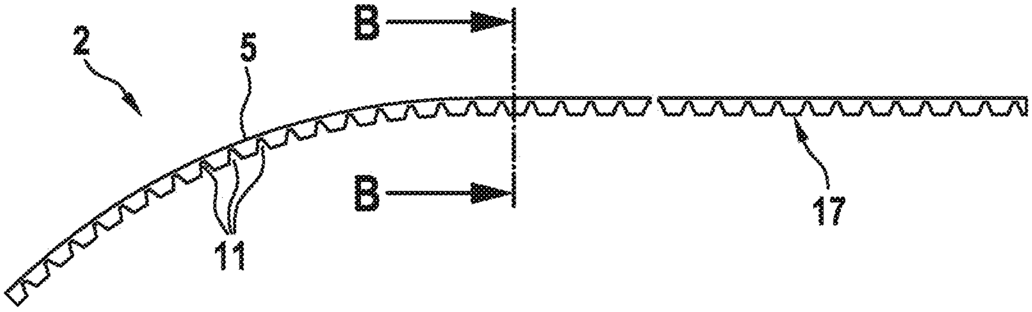
FIG. 4 shows the handrail in FIG. 1 from the side.

As can be seen in the side view of the handrail 2 shown in FIG. 4, the transverse grooves 11 can each have a v-shaped cross section.

Figure 5:
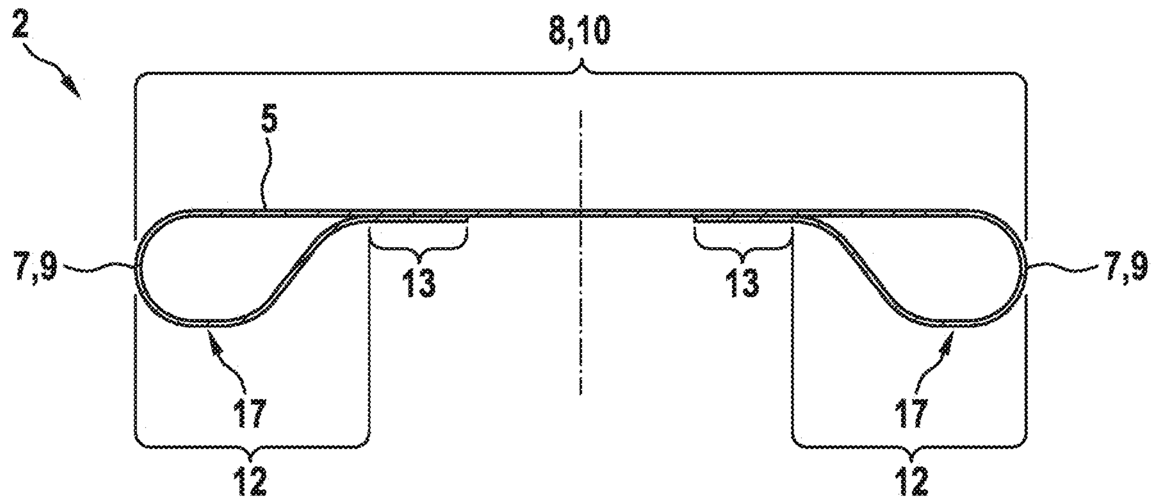
FIG. 5 is a cross-sectional view of the handrail in FIG. 1 according to a cross-sectional plane B-B drawn in FIG. 4.

It can be seen in the cross-sectional view of the handrail 2 shown in FIG. 5 that the beads 9 each comprise a round, curved bead portion 12, here curved in a drop shape, and a straight fastening portion 13, wherein the two straight fastening portions 13 are arranged between the two curved bead portions 12 and are each fastened to the handrail back 10, for example welded thereto.

Figure 6:
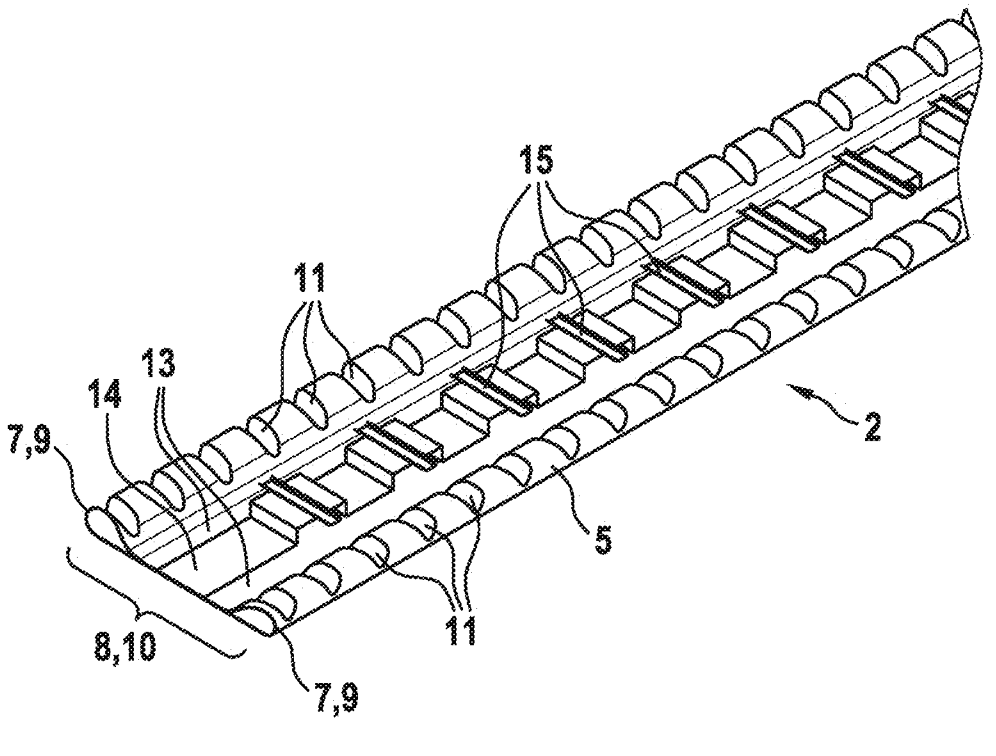
FIG. 6 shows a portion of a handrail comprising engagement elements according to one embodiment of the disclosure from below.

As shown in FIG. 6, it is alternatively possible for a support band 14, for example, in the form of an additional sheet-metal band, to be additionally inserted into a gap between the handrail back 10 and the two straight fastening portions 13 and to be fastened to the sheet-metal band 5.

In this example, a plurality of engagement elements 15, into which the drive wheel 3 can positively engage, are fastened to the center of the support band 14 between the two beads 9. The engagement elements 15 can in this case be distributed over the entire length of the sheet-metal band 5.

In order to make the handrail 2 more comfortable, the handrail 2 can be brought to a temperature that is perceived as pleasant by heating and/or cooling the sheet-metal band 5 using an optional heating device and/or cooling device 16 (see FIG. 1).

Finally, it should be noted that terms such as "comprising," "having," etc. do not exclude other elements or steps, and terms such as "a" or "an" do not exclude a plurality. Furthermore, it should be noted that features or steps that have been described with reference to one of the above embodiments can also be used in combination with other features or steps of other embodiments described above. Reference signs in the claims should not be considered to be limiting.

The invention claimed is:

1. A handrail for a passenger transportation system configured as an escalator or a moving walkway, the handrail comprising:
- a sheet-metal band comprising two edge portions and a central portion located between the two edge portions;
- wherein the edge portions are each bent to form a bead, and the central portion is shaped to form a handrail back extending between the beads, the handrail back configured for receiving a hand of a user;
- wherein each bead comprises, on a bead underside which faces away from the handrail back:
  - a plurality of transverse grooves distributed in a longitudinal direction of the sheet-metal band, and
  - a curved bead portion and a straight fastening portion, and
  - wherein the curved bead portion comprises the transverse grooves, and
- wherein the straight fastening portion is fastened to the handrail back.

2. The handrail of claim 1, wherein the transverse grooves of at least one of the beads are configured to engage in at least one drive wheel of a drive device for driving the handrail.

3. The handrail of claim 1, wherein the transverse grooves each comprise a v-shaped cross section.

4. The handrail of claim 1, wherein the transverse grooves of each bead are positioned opposite each other in pairs.

5. The handrail of claim 1, further comprising:
- a plurality of engagement elements fastened to the sheet-metal band configured to engage in at least one drive wheel of a drive device configured to drive the handrail, wherein the engagement elements are positioned between the beads in the longitudinal direction of the sheet-metal band.

6. The handrail of claim 5, wherein the engagement elements are fastened to the sheet-metal band via a support band.

7. The handrail of claim 6, wherein the support band is configured to act as an additional sheet-metal band.

8. The handrail of claim 6, wherein the support band is positioned in a gap between the straight fastening portions and is configured to fasten the straight fastening portions to the handrail back.

9. The handrail of claim 1, further comprising:
- a heating device configured to heat the sheet-metal band.

10. The handrail of claim 1, wherein the sheet-metal band is made of stainless steel.

11. The handrail of claim 1, wherein the sheet-metal band is assembled from at least two sheet-metal band parts.

12. A passenger transportation system configured as an escalator or a moving walkway, wherein the passenger transportation system comprises:
- the handrail of claim 1; and
- a drive device comprising at least one drive wheel configured to drive the handrail, wherein the drive wheel is configured to engage the handrail.

13. The handrail of claim 1, wherein the two edge portions and the central portion are positioned transversely to the longitudinal direction of the sheet-metal band.

14. The handrail of claim 1, wherein the curved bead portion and the straight fastening portion are positioned transversely to the longitudinal direction.

15. The handrail of claim 2, wherein the transverse grooves each comprise a v-shaped cross section.

16. The handrail of claim 2, wherein the transverse grooves of each bead are positioned opposite each other in pairs.

17. The handrail of claim 2, further comprising:

a plurality of engagement elements fastened to the sheet-metal band configured to engage in at least one drive wheel of a drive device configured to drive the handrail, wherein the engagement elements are positioned between the beads in the longitudinal direction of the sheet-metal band.

18. The handrail of claim 7, wherein the support band is positioned in a gap between the straight fastening portions and is configured to fasten the straight fastening portions to the handrail back.

19. The handrail of claim 1, further comprising:

a cooling device configured to cool the sheet-metal band.

20. The handrail of claim 1, wherein at least part of the sheet-metal band is coated with a plastics coating.

* * * * *